United States Patent [19]

Hickey

[11] Patent Number: 4,606,515
[45] Date of Patent: Aug. 19, 1986

[54] HYBRID ANNULAR AIRSHIP

[76] Inventor: John J. Hickey, 27 Bowdoin St., Apt. 4-A, Boston, Mass. 02114

[21] Appl. No.: 614,819

[22] Filed: May 29, 1984

[51] Int. Cl.[4] .......................... B64B 1/36; B64B 1/26
[52] U.S. Cl. .................................. 244/29; 244/23 C
[58] Field of Search ............... 244/23 B, 23 C, 23 D, 244/29, 52, 73 R, 73 B

[56] References Cited

U.S. PATENT DOCUMENTS

| 1,457,024 | 5/1923 | Franzen | 244/29 |
| 1,608,461 | 11/1926 | Cogswell | 244/29 |
| 1,677,688 | 7/1928 | Rees | 244/29 |
| 1,766,358 | 6/1930 | Rose | 244/29 |
| 3,321,156 | 5/1967 | McMasters | 244/12.2 |
| 3,620,485 | 11/1971 | Gelhard | 244/29 |
| 3,820,744 | 6/1974 | Denton | 244/30 |
| 4,014,483 | 3/1977 | MacNeill | 244/23 C |
| 4,120,468 | 10/1978 | Fischer | 244/12.2 |
| 4,269,375 | 5/1981 | Hickey | 244/12.2 |

FOREIGN PATENT DOCUMENTS

| 683653 | 4/1964 | Canada | 244/23 C |
| 99792 | 6/1964 | Denmark | 244/30 |
| 580657 | 9/1930 | France | 244/12.2 |
| 2027403 | 2/1980 | United Kingdom | 244/29 |

Primary Examiner—Galen L. Barefoot
Assistant Examiner—Rodney Corl
Attorney, Agent, or Firm—Morse, Altman & Dacey

[57] ABSTRACT

A hybrid annular airship of the kind including an annulus containing at least one gas containing portion is disclosed which is characterized by improved maneuverability, stability and speed. This improvement is effected by combined means comprising a pair of tubes mounted diametrically within the annulus and normal one to the other. A plurality of doors are provided for selectively closing off one or the other of the pair of tubes. Each tube is provided with a propulsion unit, having an access port, and preferably reversibly mounted therein. The tubes either are mounted on the same level or at different levels. Preferably, the propulsion units are jet engines which are individually operable. An elevator and a walkway preferably are provided communicating with each of the access ports leading to the propulsion units. Preferably, each access port has its own opening and closing mechanism.

3 Claims, 9 Drawing Figures

HYBRID ANNULAR AIRSHIP

BACKGROUND OF THE INVENTION

1. Field of the Invention

The present invention relates generally to lighter than air airships and, more particularly, to a hybrid annular airship having an annulus containing gas cells and characterized by improved maneuverability, stability and speed.

2. The Prior Art

In my prior U.S. Pat. No. 4,269,375, granted on May 26, 1981, I have disclosed a hybrid annular airship combining the advantages of helicopters and air ships and eliminating disadvantageous features of each. The present disclosure has for its purpose the provision of improvements regards maneuverability, stability and speed of such hybrid annular airships.

As known, lighter than air airships go back a long way, even before the advent of the Graf Zeppelin. Similarly, helicopters also have been with us for quite some time. And, as a perusal of the references cited in my above said United States patent reveals, certain combinations of helicopters and lighter than air airships also have been attempted, with various and different degrees of success. These combinations leave plenty of room for improvements.

SUMMARY OF THE INVENTION

It is a principal object of the present invention to overcome the above disadvantages of the prior art by providing a hybrid annular airship characterized by improved maneuverability, stability and speed.

More specifically, it is an object of the present invention to provide a hybrid annular airship of the kind including an annulus containing at least one gas containing portion, which airship is provided with combined means endowing the airship with improved maneuverability, stability and speed.

More specifically, it is an object of the present invention to provide a hybrid annular airship of the kind including an annulus containing at least one gas containing portion, which airship is provided with combined means endowing the airship with improved maneuverability, stability and speed. The annulus is of balanced design and endows the airship with amphibian attributes, allowing it to land equally on a lake, a river or a relatively calm sea. The combined means essentially comprises a pair of tubes mounted diametrically within the annulus of the hybrid airship and normal to one another. A plurality of doors are provided in the pair of tubes for selectively shutting off one or the other of the pair of tubes. Preferably, each tube is provided with a propulsion unit, having an access port, and mounted for reversible operation within the tube. Preferably, the propulsion units are jet engines which are individually operable. Preferably, an elevator and a walkway are provided communicating with each of the access ports leading to the propulsion units. Preferably, each access port has its own opening and closing mechanism. The tubes either are mounted on the same level or at different levels. The combined means permits the airship to deal more effectively with head winds, improves the hovering ability of the airship, and it also allows the airship better to take advantage of a jet stream or any other favorable tail winds.

Other objects of the present invention will in part be obvious and will in part appear hereinafter.

The invention accordingly comprises the combined means of stabilization, maneuverability, guidance and speed for a hybrid annular airship having an annulus containing at least one gas containing portion, said combined means being of the present disclosure, its components, parts and their interrelationships, the scope of which will be indicated in 4 the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

In general, the illustrated embodiment of a hybrid annular airship 10 is similar to the airship disclosed in my said prior U.S. Pat. No. 4,269,375 that was granted me on May 26, 1981, the disclosure of which is incorporated herein by reference. It must be pointed out, however, that the invention as hereinafter more fully described and as claimed herein, can be equally well incorporated into and form a part of any like airship of the kind including an annular base portion 12 containing at least one gas containing portion. The invention herein endows the hybrid annular airship 10 into which it is incorporated by improved maneuverability, stability and speed. Such improvement essentially includes combined means 80 which will be described in detail after first describing the preferred embodiment of the hybrid annular airship 10.

Figure 3:
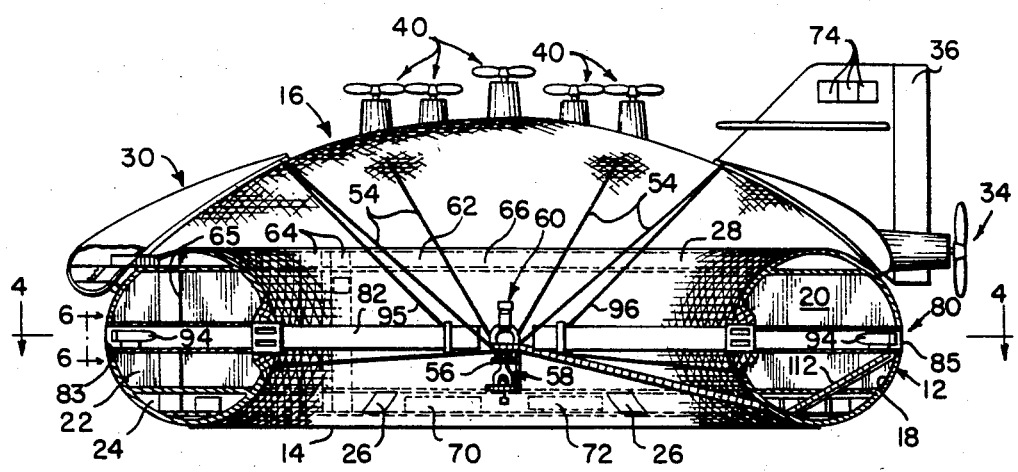
FIG. 3 is a section, on an enlarged scale, taken along the line 3—3 of FIG. 2.

In addition to the annular base portion 12, the hybrid annular airship 10 further is provided with a base plate 14 and a geodesic dome 16 where the framework largely is open. The annular base portion 12 contains an annulus 18, note FIG. 3, which contains a number of circumferentially arranged gas cells 20, respectively held in place by webs of steel wires 22, interposed between the gas cells 20. As known, the lift afforded the airship 10 can be increased or decreased by varying the number of cells 20 charged with a gas, such as helium. The annular base portion 12 further includes a bottom hold 24, provided with doors 26, and an upper catwalk 28. The illustrated framework of the hybrid annular airship 10 preferably is of the type described in Fuller, U.S. Pat. No. 2,682,235.

Figure 1:
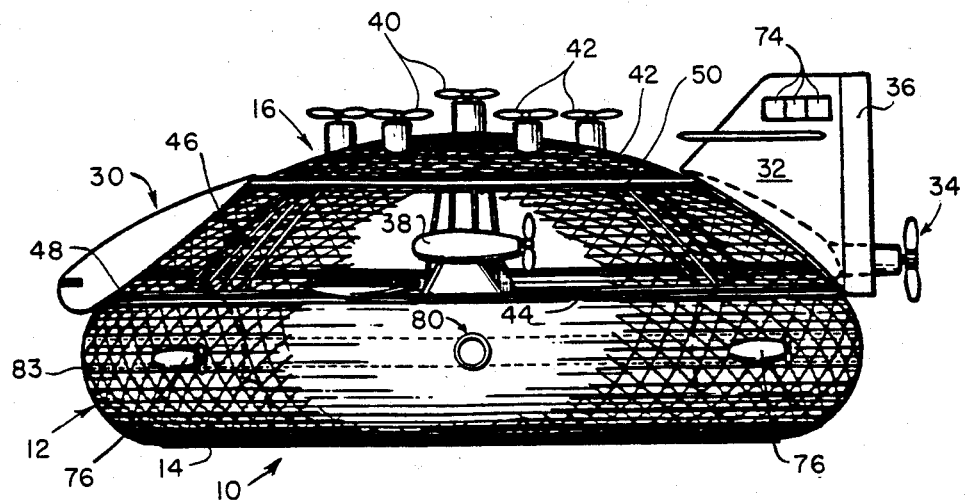
FIG. 1 is a somewhat schematic side elevation of a hybrid annular airship in accordance with the invention.
Figure 2:
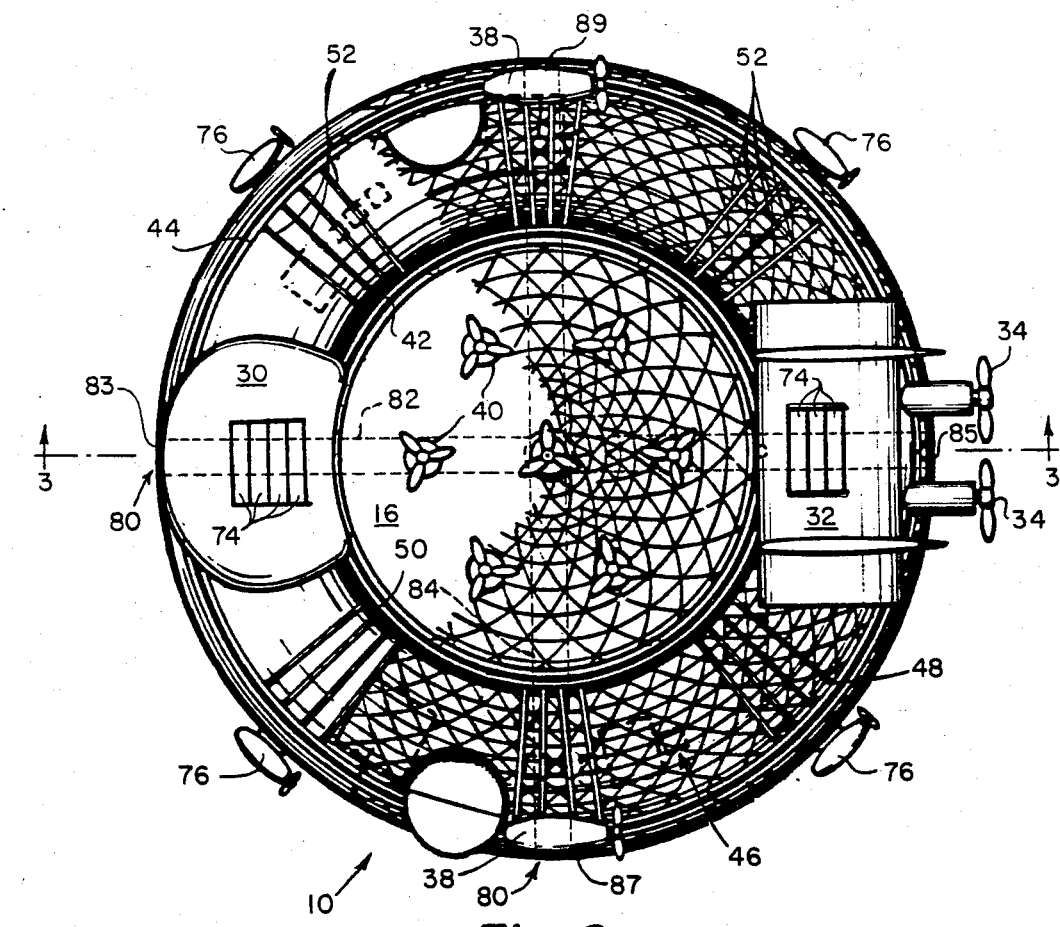
FIG. 2 is a plan view of the hybrid annular airship of FIG. 1.

The framework indirectly supports a cabin 30, a unit 32 spaced 180° therefrom and provided with main forward propulsion engines 34, rudders 36 and auxiliary engines 38, note FIGS. 1 and 2. All engines 34 and 38 preferably are of a type having reversibly pitched propellers. The framework also directly supports lifting engines 40 to effect and control vertical ascent and descent. The lifting engines 40 also are of the type having reversibly pitched propellers.

The framework has encircling tracks, including upper and lower rail units 42 and 44, for a carrier 46. The carrier 46 also includes a series of interconnecting radial supporting and retaining rods 52 between lower and upper rings 48 and 50.

For mooring purposes and also for use in lifting and transporting heavy cargo units, the dome 16 has cables 54 connected to the framework and to a central mount 56 supporting a hoist 58. Mooring preferably is to a suitable anchor secured in bedrock. Power for hoisting preferably is derived from a nuclear powered generator 60. The upper catwalk 28 also includes, among others, crew quarters 62, freight and passenger elevators 64 between the catwalk 28 and the bottom hold 24, a crew's mess 66, appropriate supplies area 68 and the like. The bottom hold 24, in turn, includes among others, a fuel storage area 70 and a cargo and spare parts area 72. The airship 10 further preferably is provided with a plurality of solar cells 74 both for the cabin 30 and the unit 32 to furnish heat and power respectively thereto. The framework at the annular base portion 12 also carries a plurality of small engines 76, note FIGS. 1 and 2.

As more fully described in said U.S. Pat. No. 4,269,375, of mine, the employment of the carrier 46 on the tracks including the upper and lower rail units 42 and 44, enables the direction of forward propulsion of the airship 10 to be changed 90° in either direction independently of the ship's framework. In effecting this maneuver, the engines 38 are operated to effect opposite carrier turning thrusts. At the same time, the appropriate ones of the small engines 76 carried by the framework below the path of the cabin 30 are employed to counter any tendency of the framework to turn with the carrier 46.

The present invention is designed to increase the speed of forward propulsion of the hybrid airship 10 and also to improve its maneuverability, its handling during ascent or descent, particularly when hoisting a heavy cumbersome load, and its airborne stability. These attributes are effected by the combined means 80 mounted diametrically within the annulus 18 and the annular base portion 12 of the airship 10, above mentioned and now to be described in detail.

Figure 9:
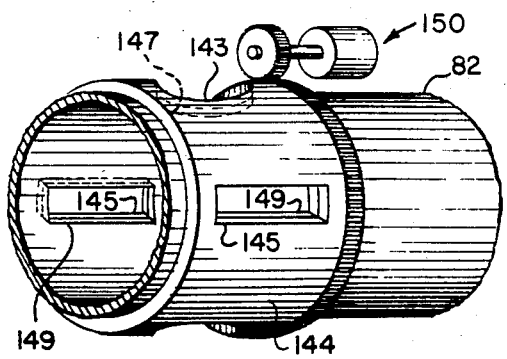
FIG. 9 is a perspective view, on an enlarged scale, of a part of the hybrid annular airship of FIG. 4.
Figure 4:
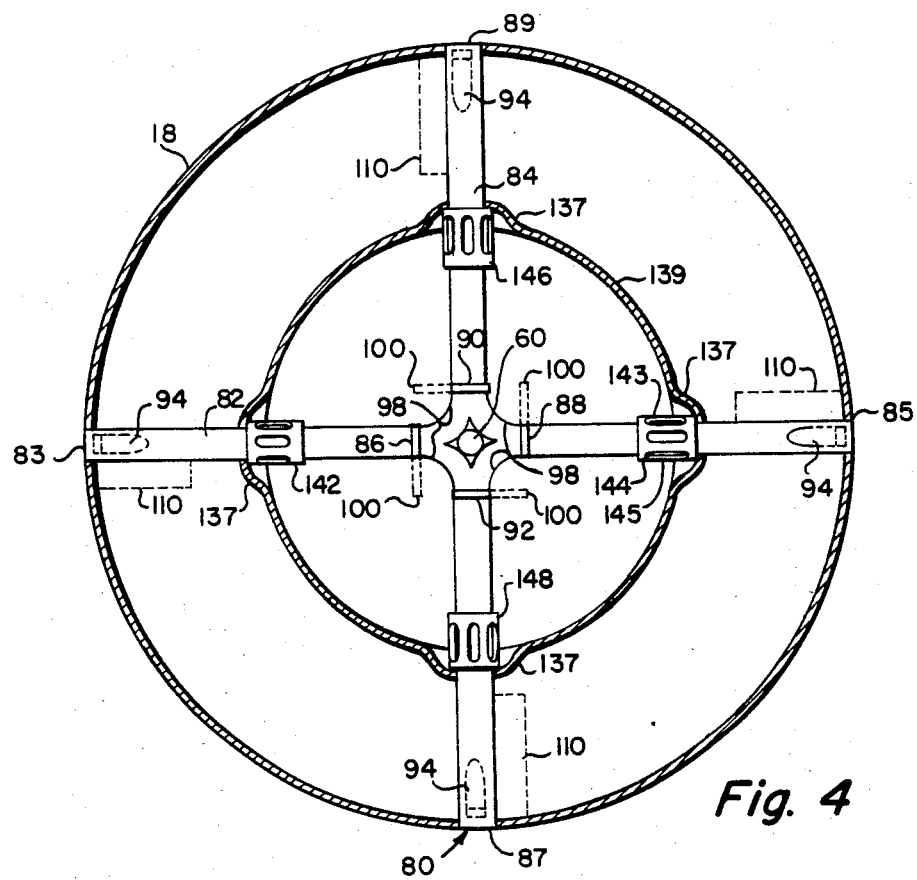
FIG. 4 is a schematic section taken along the line 4—4 of FIG. 3.

The combined means 80 essentially comprises a pair of tubes 82 and 84, a plurality of doors 86, 88, 90 and 92, a plurality of rings 142, 144, 146 and 148, each provided with either a plurality of holes 143 or a plurality of slots 145 or a combination thereof, and at least one propulsion unit 94 for each of the tubes 82 and 84 and operatively mounted therein, note FIG. 4. It should be noted that the inside of the annulus 18, is slightly indented, as at 137, so as to allow the rings 142-148 to penetrate about half-way into the inner periphery 139 of the annulus 18. Operatively associated with the rings 142-148, more specifically with the holes 143 or slots 145 thereof, are a plurality of matching holes 147 and slots 149 (observe FIG. 9) formed in the tubes 82 and 84 underneath the rings 142-148, respectively. Means 150, perferably hydraulically and remotely operable, are provided for selectively and individually rotating the rings 142-148 so as either to expose the underlying matching holes 147 and/or slots 149 or to cover the same. The pair of tubes 82 and 84 are firmly anchored within the annulus 18, and centrally thereof further are supported by cables 96, observe FIG. 3. Further, the pair of tubes 82 and 84 are mounted diametrically and normal to one another, and preferably also in the same plane. Since the nuclear powered generator 60 is disposed substantially at the center of the annulus 18, it is necessary that, in the area where the tubes 82 and 84 meet one another, elbows 98 be provided to join the tubes 82 and 84 to one another, skirting the generator 60. The tubes 82 and 84 have opposed ends 83, 85, 87 and 89, respectively, which opposed ends preferably are flush with the annulus 18. The plurality of doors 86, 88, 90 and 92, mounted intermediate of the respective opposed ends 83, 85, 87 and 89, are designed so to open and close, in opposed pairs, as to selectively open one tube 82 while at the same time, closing the other tube 84, or vice versa. Means 100 are provided adjacent the doors 86, 88, 90 and 92 to effect the opening and closing thereof on command and by remote control.

The propulsion units 94 preferably comprise jet engines. The jet engines 94 can be operatively mounted within the tubes 82 and 84, and preferably near their respective opposed ends 83, 85, 87 and 89 in one of several preferred ways hereafter described, depending on use and requirements of the particular airship 10 in which they are employed. And if desired, the propulsion units 94 can be omitted entirely. In the latter event, the presence of the tubes 82 and 84, selectively opened depending upon and into the direction of travel of the airship 10, still adds to improved stabilization and guidance of the airship 10. This improved stabilization and guidance of the airship 10 essentially is achieved by the air and wind gushing through the respective open tube 82 or 84. In fact, the speed of the airship 10 also is somewhat increased thereby, due to the circumstance that part of the air and wind is now simply passing through the airship 10 via the open tube 82 or 84 rather than going up, around and under the framework of the airship 10.

Figure 6:
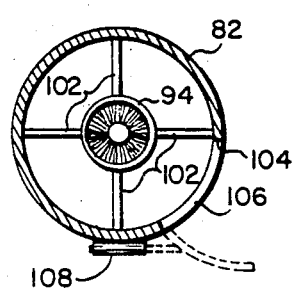
FIG. 6 is an end elevation, on an enlarged scale and along the line 6—6 of FIG. 3, of a part of the hybrid annular airship of FIG. 3.
Figure 7:
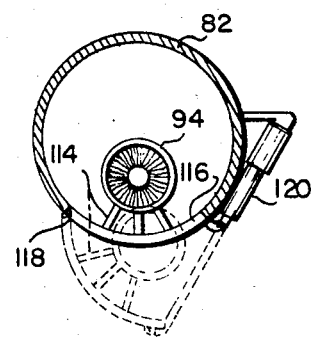
FIG. 7 is a view similar to FIG. 6 but showing a modification therein.
Figure 8:
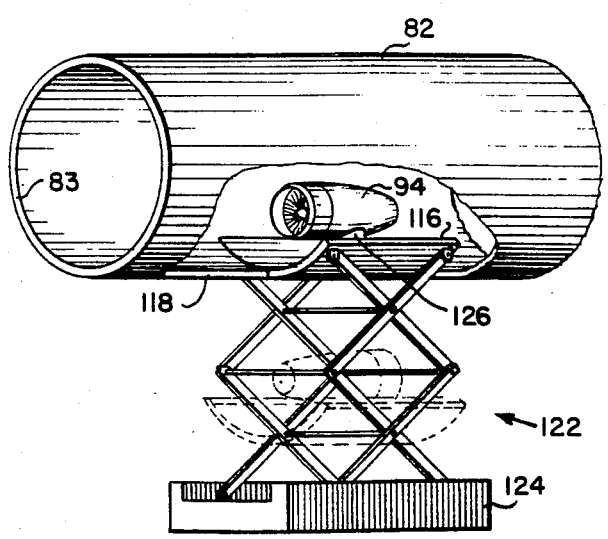
FIG. 8 is a schematic-perspective view of the part illustrated in FIG. 6 but showing a further modification therein.

Three preferred versions of the mounting of the jet engines 94 is shown in FIGS. 6, 7 and 8. In the version shown in FIG. 6, the jet engine 94 is concentrically and stationarily mounted within the tube 82 by appropriate supports 102. In order to service the jet engine 94, an opening 104 preferably is provided in the tube 82 and adjacent the mounting of the engine 94. A segment 106 of the tube 82 is designed to be moved by suitable means 108, such as a remotely operable hydraulic means, from a position shown closing the opening 104 to a position shown in phantom lines, exposing the engine 94 through the now open opening 104. Preferably, an appropriate platform and work area 110, note FIG. 4, is provided near the opening 104 to enable service personnel to work on the jet engine 94. Preferably, the platform and work area 110 is made readily accessible to personnel by being both adjacent one of the elevators 65, note FIG. 3, as well as by an appropriate walkway 112, one being illustrated at the right of the drawing. Fuel to the jet engine 94 conveniently is admitted thereto via one of the supports 102, suitably designed for that function as well.

In the version depicted in FIG. 7, the jet engine is eccentrically mounted via supports 114, in the bottom of the tube 82. In this version, a bottom segment 116 of the tube 82 supports the engine 94. This bottom segment 116 also is designed to swing down and away from an opening 118 formed in the bottom of the tube 82, as shown in phantom lines, exposing thereby the engine 94 for servicing. The segment 116 again is opened and closed by means 120, preferably hydraulically and remotely operable. It is understood that the platform and work area 110 is provided as before mentioned, but this time at a level somewhat lower than in the case of FIG. 6.

The third version of the engine mounting, depicted in FIG. 8, is the most versatile one. Here, the bottom segment 116 is designed to be lowered away and out of the opening 118 of the tube 82 by means 122 supported on a platform 124 located directly below the tube 82 and about the same level as and adjacent to the platform and work area 110, note FIG. 4. In this version, the jet engine 94 is mounted on and to the segment 116 in such a way as to be able to effect a reversal thereof, if so desired, when the segment 116 is in its lowered position, as shown in phantom lines. Such reversal of the engine 94 is achieved in one of two ways: either the means 122 is designed to turn 180°, together with the segment 116 and the thereto secured engine 94, when the means 122 is in its lowermost operative position, or, with the means 122 down, the engine 94 is itself turned 180° on its segment 116 by its support 126. The support 126, rotatably mounting the engine 94 to the segment 116, preferably is designed not only to effect such 180° turn but also to move the engine 94 into any rotational position along a full circle of 360°. This feature of being able to rotate the engine 94 in any horizontal direction greatly facilitates the servicing of the engine 94. However, once servicing of the engine 94 has been accomplished, there are but two operative positions for the engine 94 and both locate the engine 94 with its longitudinal axis parallel to the axis of the tube 82, in one position facing the end 83 and in the other position facing away from the end 83.

Figure 5:
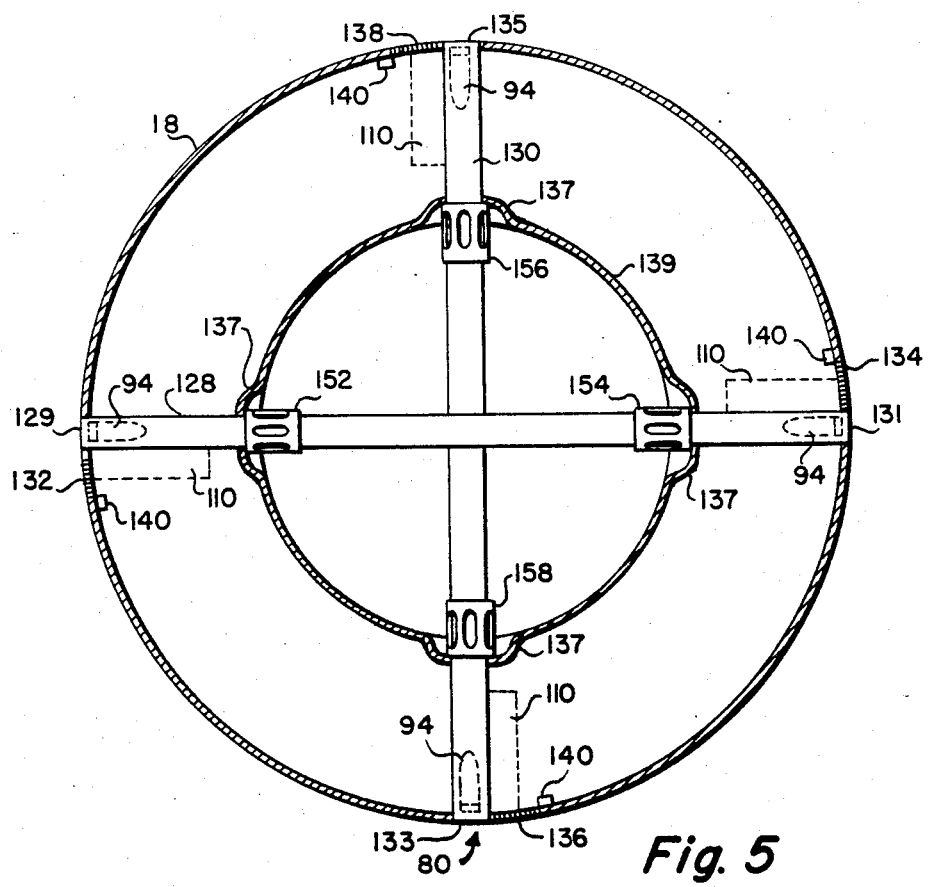
FIG. 5 is a view similar to FIG. 4 but showing a modification therein.

In FIG. 5, there is depicted a modification in the construction of the combined means 80 to give the airship 10 its improved maneuverability, stability and speed. The combined means 80, according to the embodiment of FIG. 5, also comprises a pair of tubes 128 and 130 that are diametricaly mounted within the annulus 18 and normal to one another. Further, the pair of tubes 128 and 130 also are provided with a plurality of rings 152, 154, 156 and 158, each featuring a plurality of holes and/or slots, or a combination thereof, to cooperate with a plurality of holes and/or slots, or a combination thereof, formed in the tubes 128 and 130 underneath and in operative association with the plurality of holes and/or slots of the rings 152-158. But unlike the pair of tubes 82 and 84 of the embodiment shown in FIG. 4, the tubes 128 and 130 are mounted at different levels, one above the other. This, of course, also requires the relocation of the nuclear powered generator 60 and the hoist 58 and central mount 56 to be located either above, or preferably below the lowermost of the tubes 128 and 130. In the alternative, the nuclear powered generator 60 also can be omitted and its functions taken over by other energy sources with which the airship 10 already is equipped. In another alternative, the nuclear powered generator 60 can be mounted off center.

The tubes 128 and 130 also have opposed ends 129, 131, 133 and 135, respectively, that preferably are flush with the annulus 18, as shown. A plurality of doors 132, 134, 136 and 138 respectively also are provided for selectively closing off one or the other of the pair of tubes 128 and 130. This time, however, the doors 132, 134, 136 and 138 are located at the respective ends 129, 131, 133 and 135 of the tubes 128 and 130 and flush with the annulus 18. Means 140 are provided for each of the doors 132, 134, 136 and 138 for independently sliding them into open or closed position on command by remote control from the cabin 30. Otherwise, the tubes 128 and 130 also are provided with propulsion units 94 which preferably are jet engines. The mountings of these jet engines 94 adjacent the respective platforms and work areas 110 again can take one of the three versions depicted in and described with reference to FIGS. 6, 7 and 8.

The hybrid annular airship 10, incorporating the combined means 80 of stabilization, guidance, maneuverability and propulsion, as above described, can be operated in a variety of ways, depending upon the airship's requirements. During ascent or descent, all doors of the pair of tubes preferably are open and the jet engines 94 are individually operated to assist in sideways maneuvering or banking of the airship 10. Once cruising altitude has been reached, the doors are operated in such a manner as to close off one or the other of the pair of tubes 82, 84 or 128 and 130, depending on the forward direction of the airship 10. It being understood that the particular tube facing the direction of motion of the airship 10 is open, and the tube transverse thereto is closed. In order to assist dealing with eddy currents generated in the central open region of the annulus 18, the rings 142-148 or the rings 152-158 come into operation as follows. Assuming that the airship 10 is cruising in the direction defined by the end 83 of the tube 82 (FIG. 4), the doors 86 and 88 are open and the doors 90 and 92 are closed. Further, the ring 144 is made to rotate about the tube 82 by the means 150 (FIG. 9) in such a manner as to match the plurality of holes 143 and/or slots 145 with the plurality of the corresponding holes 147 and/or slots 149 formed in the tube 82 itself. With those holes 147 and/or slots 149 exposed, any eddy currents are now free to be sucked into the tube 82 itself rather than presenting a drag to the forward motion of the annulus 18. All the other three rings 142, 146 and 148 remain so as to close off the holes and/or slots of the tubes 82 and 84 formed in operative association with those rings. Should the airship 10 be heading in the direction as defined by the end 89 of the tube 84, the doors 90 and 92 will be made to open, and the ring 148 will be rotated so as to expose the holes and/or slots in the tube 84, with all the other rings 142, 144 and 146 being in the closed position.

The jet engines 94 in the open tube only are operated, and they can be operated together in tandem or only one of them is operated, depending on the thrust and consequent speed desired. When effecting a 90° change in direction of the carrier 46 without a corresponding change in the annulus 18, as per my previous above mentioned U.S. Pat. No. 4,269,375, all the pilot of the air ship 10 now need to do is to close off the heretofore open tube of the pair of tubes 82,84 or 128,130 and open the tube normal therto. Then, by shutting off the engines 94 in the closed off tube, and firing on the engines 94 in the now open tube, the airship 10 is quickly made to resume a new course 90° off from the previous course, and all without having to turn the entire framework of the airship 10 one degree form its previous position.

Thus, it has been shown and described a hybrid annular airship 10 provided with a combined means 80 of stabilization, guidance and speed, which airship 10 satisfies the objects and advantages set for the above.

Since certain changes may be made in the present disclosure without departing form the scope of the present invention, it is intended that all matter described in the foregoing specification or shown in the accompanying drawings, be interpreted in an illustrative and not in a limiting sense.

What is claimed is:

1. Combined means of stabilization and guidance for a hybrid annular airship having an annulus containing a plurality of gas cells, said combined means comprising:
   (a) a pair of tubes;
   (b) a plurality of doors for selectively closing off one of said pair of tubes
   (c) said pair of tubes being diametrically mounted within said annulus and normal to one another;
   (d) each of said pair of tubes having opposed ends being flush with said annulus and said plurality of doors being mounted intermediate of said opposed ends, said annulus having a plurality of indents on its inside adjacent said pair of tubes, and a plurality of rings having holes mounted about said pair of tubes, said pair of tubes provided with a plurality of holes in operative association with said rings, and means for rotating said rings about said tubes.

2. The combined meams of claim 1 wherein said plurality of doors are mounted at said oppsed ends.

3. In a hybrid airship of the kind including an annulus containing at least one gas containing portion, a framework providing an annular base portion containing said annulus and an upwardly projecting central portion, a cabin and flight effecting and guidance means and means operable to effect vertical flight of said airship, the improvement comprising combined means of stabilization, guidance, maneuverability and propulsion for said hybrid airship, said combined means comprising:
   (a) a pair of tubes mounted diametrically within said annulus and normal to one another;
   (b) a plurality of doors for selectively closing off one of said pair of tubes; and
   (c) at least one propulsion unit for each of said pair of tubes operatively mounted therein:
   (d) said pair of tubes being mounted at the same level and having opposed ends flush with said annulus, and said plurality of doors being mounted intermediate of said opposed ends, said annulus having a plurality of indents on its inside adjacent said pair of tubes, and a plurality of rings having holes and mounted about said pair of tubes, said pair of tubes provided with a plurality of holes in operative association with said rings, and means for rotating said rings about said tubes.

* * * * *